(12) United States Patent
Yukimoto et al.

(10) Patent No.: US 12,370,690 B2
(45) Date of Patent: Jul. 29, 2025

(54) POSTURE DETERMINATION METHOD, COMPUTER-READABLE RECORDING MEDIUM STORING PROGRAM, AND COMPONENT FEEDING APPARATUS

(71) Applicant: KONICA MINOLTA, INC., Tokyo (JP)

(72) Inventors: Tomoyoshi Yukimoto, Hachioji (JP); Yasuyuki Kamai, Tokyo (JP); Shigeki Nozawa, Gifu (JP); Harumitsu Fujimori, Hino (JP); Kohei Hayashi, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 393 days.

(21) Appl. No.: 18/051,932

(22) Filed: Nov. 2, 2022

(65) Prior Publication Data
US 2023/0286162 A1    Sep. 14, 2023

(30) Foreign Application Priority Data
Dec. 13, 2021  (JP) .................... 2021-201569

(51) Int. Cl.
B25J 9/16   (2006.01)
B25J 19/02  (2006.01)

(52) U.S. Cl.
CPC .......... B25J 9/1697 (2013.01); B25J 19/021 (2013.01)

(58) Field of Classification Search
CPC ...... B25J 19/021; B25J 19/023; B25J 9/1697; G06T 7/73
See application file for complete search history.

(56) References Cited

U.S. PATENT DOCUMENTS

2018/0250822 A1*  9/2018  Shimodaira ............ B25J 9/1697
2020/0094401 A1*  3/2020  Cheng ..................... B25J 9/163
(Continued)

FOREIGN PATENT DOCUMENTS

JP    H8-168940 A    7/1996
JP    H09245177 A    9/1997

OTHER PUBLICATIONS

Notice of Reasons for Refusal issued on Apr. 22, 2025, in corresponding Japanese Patent Application No. JP 2021-201569 (with English translation) (8 pages).

*Primary Examiner* — Wade Miles
*Assistant Examiner* — Zachary Joseph Wallace
(74) *Attorney, Agent, or Firm* — Buchanan Ingersoll & Rooney PC

(57) ABSTRACT

A posture determination method is to determine, based on an image acquired for a component having a plurality of surfaces, a posture of the component. This posture determination method includes recognizing an outer shape of the component from the image, detecting a feature amount of a surface shape in a determination area being a part of the component based on the outer shape of the component recognized in the recognizing, and determining. In the determining, the posture of the component is determined by comparing a first reference amount indicating a reference feature amount in the determination area of a first surface of the component and a second reference amount indicating a reference feature amount in the determination area of a second surface of the component with the feature amount detected in the detecting.

8 Claims, 12 Drawing Sheets

(56) References Cited

U.S. PATENT DOCUMENTS

| | | | |
|---|---|---|---|
| 2022/0092330 A1* | 3/2022 | Amano | G06T 7/55 |
| 2022/0405506 A1* | 12/2022 | Taamazyan | G06T 7/50 |
| 2023/0125022 A1* | 4/2023 | Li | B25J 9/023 |
| | | | 700/245 |
| 2024/0083038 A1* | 3/2024 | Nakai | B25J 19/023 |

* cited by examiner

POSTURE DETERMINATION METHOD, COMPUTER-READABLE RECORDING MEDIUM STORING PROGRAM, AND COMPONENT FEEDING APPARATUS

CROSS-REFERENCE TO RELATED APPLICATIONS

The entire disclosure of Japanese patent Application No. 2021-201569, filed on Dec. 13, 2021, is incorporated herein by reference in its entirety.

BACKGROUND

Technological Field

The present invention relates to a posture determination method, a computer-readable recording medium storing a program, and a component feeding apparatus.

Description of the Related Art

There is known image recognition processing for obtaining a position and inclination of a workpiece (component) by photographing the workpiece with a camera. Patent Literature 1 discloses a method of selecting image recognition conditions for selecting the optimum image recognition condition for each component.

In the method of selecting image recognition conditions disclosed in Patent Literature 1, conditions for photographing a plurality of types of workpieces and a plurality of types of processing conditions are set as recognition conditions. The photographing conditions are, for example, the angle of a workpiece and the illumination intensity, and the processing conditions are, for example, a preprocessing method and recognition processing method of a captured image. Next, image recognition processing under all the image recognition conditions combining each imaging condition and each processing condition is performed to calculate a recognition error for each image recognition condition. Then, the image recognition condition with the smallest recognition error is selected as the optimum image recognition condition.

Related Art Literature

Patent Literature

Patent Literature 1: JP H09-245177 A

SUMMARY

Incidentally, the external shape of a component can be easily and clearly captured, but the surface shape of a component is difficult to capture as clearly as the external shape. For this reason, when a component is photographed under the same image recognition condition, information on the surface shape obtained from the captured image is reduced. Therefore, with the method for selecting image recognition conditions disclosed in Patent Literature 1, a recognition error when the image recognition processing is performed increases, and the accuracy of determining the posture (front and rear) of the component decreases.

In view of the above problem, a purpose of the present invention is to provide a posture determination method, a computer-readable recording medium storing a program, and a component feeding apparatus that are capable of accurately determining the posture of a component.

In order to achieve at least one of the above purposes, a posture determination method reflecting one aspect of the present invention is to determine, based on an image acquired for a component having a plurality of surfaces, a posture of the component. This posture determination method includes recognizing an outer shape of the component from the image, detecting a feature amount of a surface shape in a determination area being a part of the component based on the outer shape of the component recognized in the recognizing, and determining. In the determining, a posture of the component is determined by comparing a first reference amount indicating a reference feature amount in the determination area of a first surface of the component and a second reference amount indicating a reference feature amount in the determination area of a second surface of the component with the feature amount detected in the detecting.

According to an embodiment of the present invention, it is possible to accurately determine the posture of a component.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment to which the present invention is applied will be described in detail with reference to the drawings.

1. First Embodiment

[Configuration of Component Feeding Apparatus]

Figure 1:
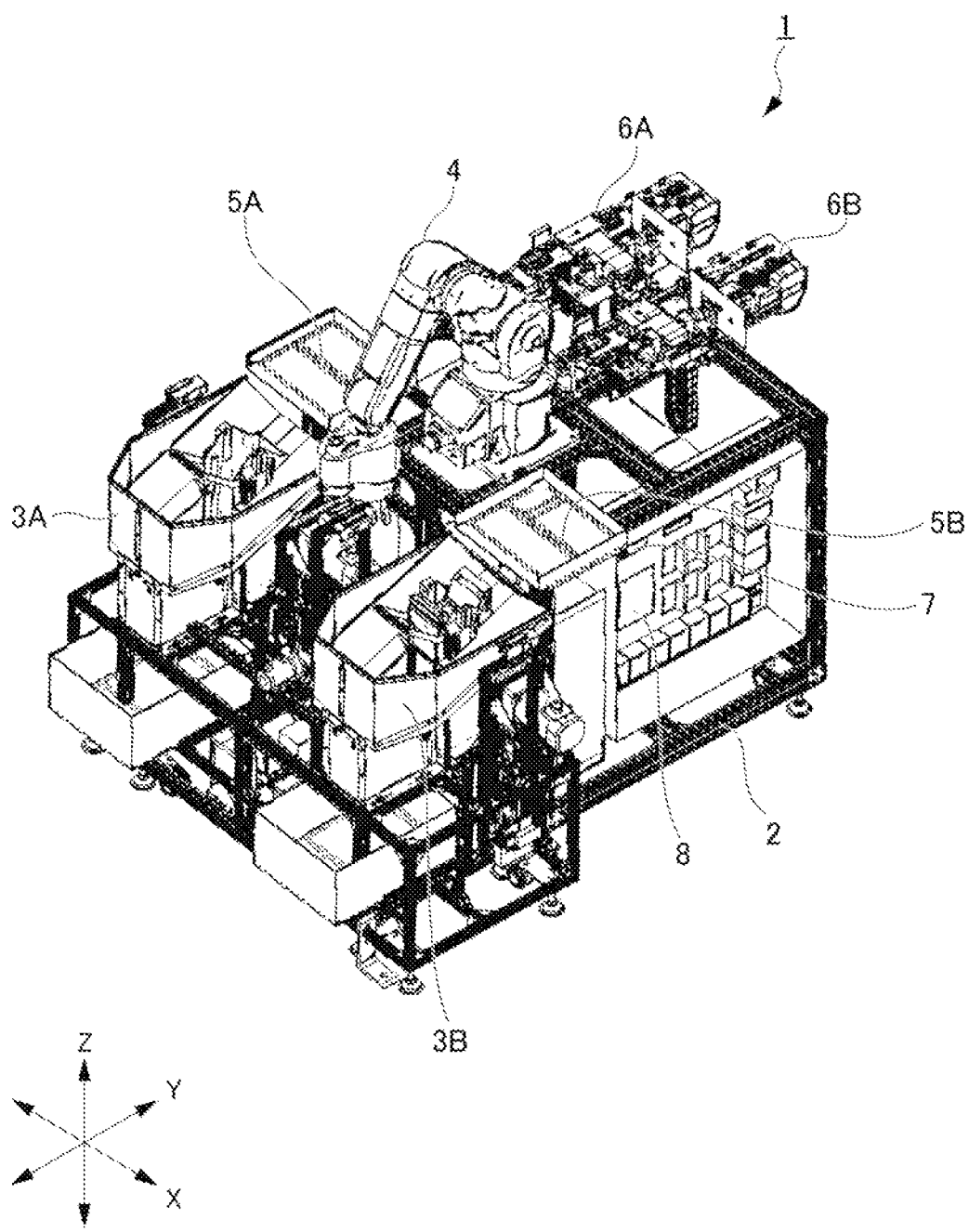
FIG. 1 is a perspective view of a component feeding apparatus according to a first embodiment of the present invention.
Figure 2:
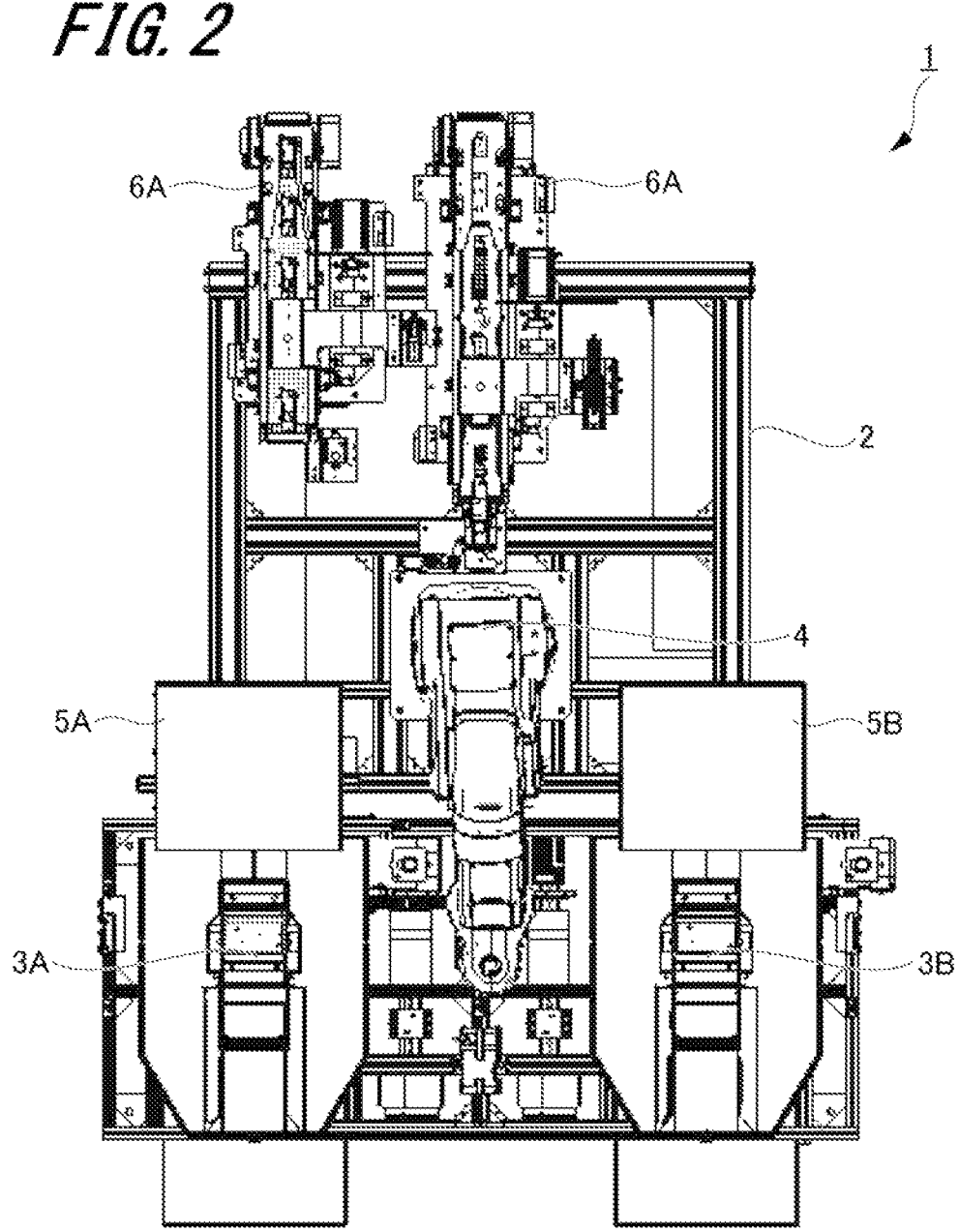
FIG. 2 is a top view of the component feeding apparatus according to the first embodiment of the present invention.
Figure 3:
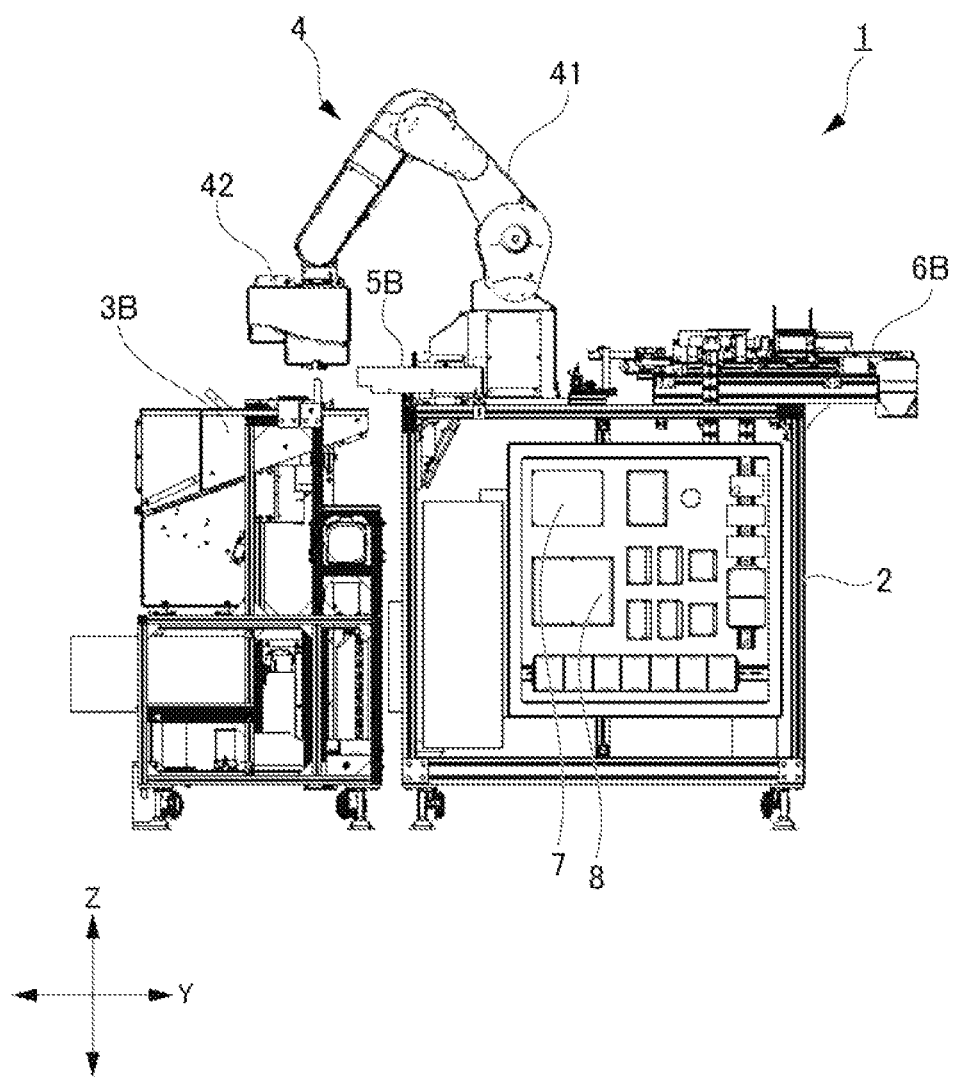
FIG. 3 is a side view of the component feeding apparatus according to the first embodiment of the present invention.

First, a configuration of a component feeding apparatus according to a first embodiment will be described with reference to FIGS. 1 to 3. FIG. 1 is a perspective view of a component feeding apparatus according to the first embodiment of the present invention. FIG. 2 is a top view of the component feeding apparatus according to the first embodiment of the present invention. FIG. 3 is a side view of the component feeding apparatus according to the first embodiment of the present invention.

As illustrated in FIG. 1, a component feeding apparatus 1 according to a first embodiment includes a frame 2, containers 3A and 3B, a feeder 4, picking tables 5A and 5B, placing tables 6A and 6B, a control board 7, and a displayer 8. The containers 3A and 3B, the feeder 4, the picking tables 5A and 5B, the placing tables 6A and 6B, and the control board 7 are attached to the frame 2. The component feeding apparatus 1 places components contained in the containers 3A and 3B on the placing tables 6A and 6B while aligning the postures thereof, and feeds the components to an apparatus in the next process.

The frame 2 is formed in a substantially rectangular parallelepiped shape and has a width, a depth, and a height. In FIGS. 1 to 3, an X-axis direction indicates the width direction of the frame 2, a Y-axis direction indicates the depth direction of the frame 2, and a Z-axis direction indicates the height direction of the frame 2. The X-axis direction and the Y-axis direction correspond to horizontal biaxial directions that are two axial directions parallel to a horizontal plane, and the Z-axis direction corresponds to a vertical direction that is a direction orthogonal to the horizontal plane. The frame 2 is constituted by a horizontal member extending in the X-axis direction or the Y-axis direction and a vertical member extending in the Z-axis direction.

The containers 3A and 3B are disposed on one side of the frame 2 in the Y axis direction. The containers 3A and 3B face each other with an appropriate distance in the X-axis direction. The containers 3A and 3B are formed in a substantially box shape with an open top. The containers 3A and 3B are each provided with a lifting/lowering mechanism that moves the bottom in the Z-axis direction. This allows each of the containers 3A and 3B to change the containing capacity and the height position of the contained components.

For example, the container 3A contains first components, and the container 3B contains second components different from the first components. The component feeding apparatus 1 in this case feeds the first components and the second components to the apparatus in the next process. Alternatively, the containers 3A and 3B may contain the first components in a first period, and the containers 3A and 3B may contain the second components in a second period different from the first period. The component feeding apparatus 1 in this case feeds the first components to the apparatus in the next process in the first period, and feeds the second components to the apparatus in the next process in the second period.

The feeder 4 is disposed substantially in the center of the upper part of the frame 2. The feeder 4 grasps one or a plurality of components from a large number of first components or a large number of second components contained in the containers 3A and 3B, and drops the components onto the picking tables 5A and 5B to feed them. Accordingly, the first components or the second components are placed on the picking tables 5A and 5B. Alternatively, the feeder 4 grasps the first component or the second component placed on the picking tables 5A and 5B one by one to feed the first component or the second component to the placing tables 6A and 6B. The configuration of the feeder 4 will be described later with reference to FIGS. 4 and 5.

The picking tables 5A and 5B are disposed on both sides of the feeder 4 in the X-axis direction. The picking tables 5A and 5B are adjacent to the containers 3A and 3B in the Y-axis direction, respectively. The picking tables 5A and 5B are positioned above the containers 3A and 3B.

In the Z-axis direction, a part of the picking table 5A overlaps the container 3A. Accordingly, a component dropped from the part of the picking table 5A is contained in (returned to) the container 3A. In the Z-axis direction, a part of the picking table 5B overlaps the container 3B. Accordingly, a component dropped from the part of the picking table 5B is contained in (returned to) the container 3B.

The placing tables 6A and 6B correspond to feed positions according to the present invention. The placing tables 6A and 6B each have a belt conveyor that conveys components in the Y-axis direction. The placing tables 6A and 6B are attached to an X-axis moving mechanism. The X-axis moving mechanism moves the placing tables 6A and 6B in the X-axis direction. The placing tables 6A and 6B convey the component fed from the feeder 4 in the Y-axis direction and position the components at predetermined positions. The positioned components are fed to the apparatus in the next step.

As illustrated in FIGS. 1 and 3, the control board 7 is attached to a side of the frame 2. The control board 7 is provided with a controller 71 (see FIG. 6) that controls the operations of the containers 3A and 3B, the feeder 4, and the placing tables 6A and 6B.

The displayer 8 displays various setting contents related to component feed. The various setting contents include, for example, a type of components to be fed, the number of remaining components, a determination area which will be described later, a first reference amount, a second reference amount, and the like. In addition, the displayer 8 displays errors. The errors include, for example, a malfunction of the feeder 4 and erroneous determination of posture determination which will be described later.

The displayer 8 is constituted by a touch panel display. That is, the displayer 8 also serves as an input unit to which various settings related to the component feeding operation are input. Then, the displayer 8 displays an operation screen. While viewing the operation screen displayed on the displayer 8, a user inputs various settings related to the component feeding operation, gives an instruction to perform the feeding operation, and the like. The settings input using the displayer 8 are fed to the controller 71 (see FIG. 6) of the control board 7.

[Configuration of Feeder]

Next, the configuration of the feeder 4 is described with reference to FIGS. 4 and 5.

Figure 4:
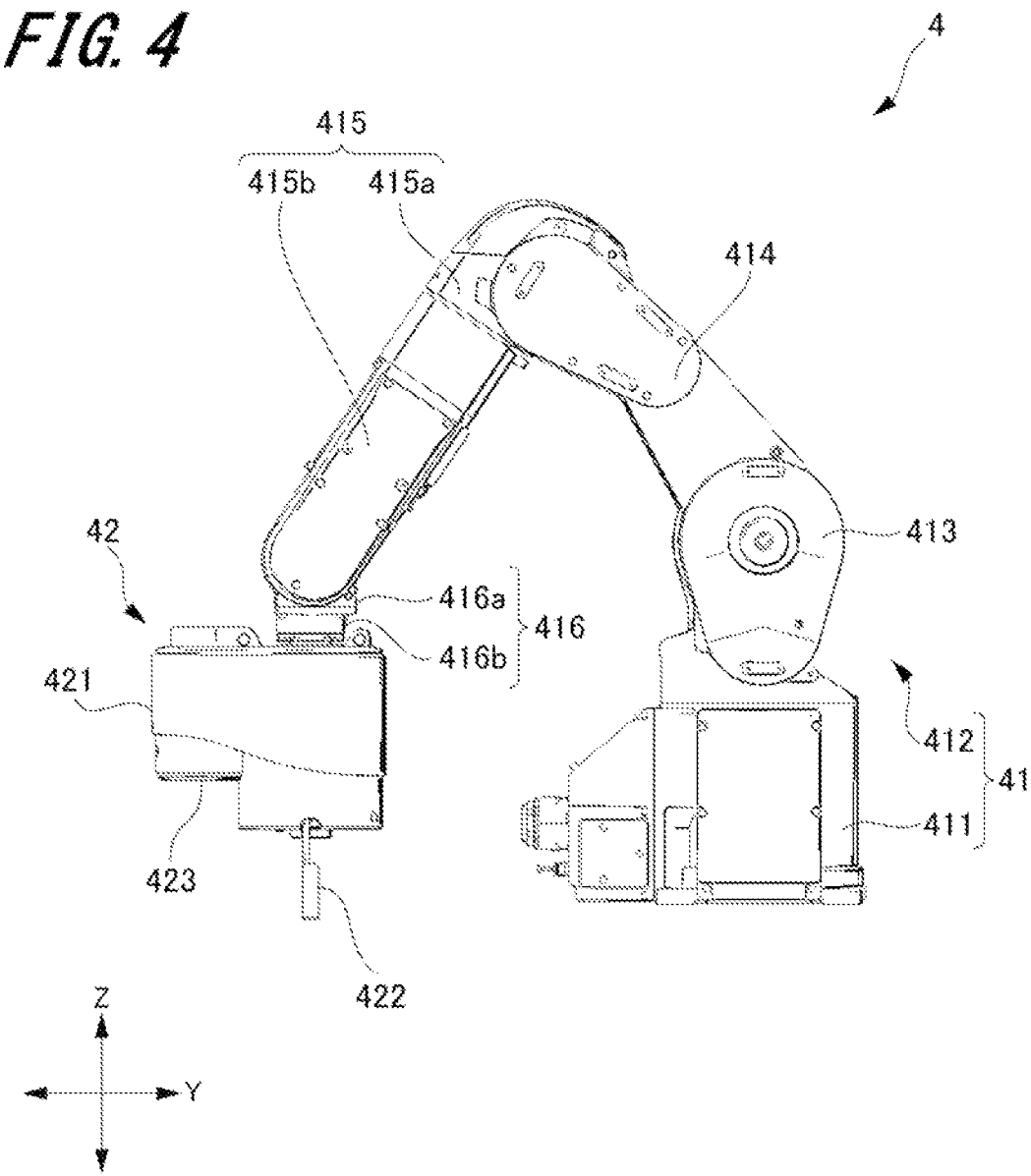
FIG. 4 is a side view of a feeder of the component feeding apparatus according to the first embodiment of the present invention.

FIG. 4 is a side view of the feeder 4 of the component feeding apparatus 1. FIG. 5 is a diagram for explaining a configuration of a hand block of the feeder 4 of the component feeding apparatus 1.

As illustrated in FIG. 4, the feeder 4 includes an arm block 41 and a hand block 42 connected to the arm block 41. The arm block 41 includes a support base 411 and an arm 412 attached to the support base 411. The support base 411 is fixed to the frame 2 (see FIG. 3). The support base 411 rotatably supports the arm 412.

The arm 412 freely moves the hand block 42 in the X-axis direction, the Y-axis direction, and the Z-axis direction. In addition, the arm 412 freely rotates the hand block 42 around the X-axis, the Y-axis direction, and the Z-axis. The arm 412 includes a base member 413, a first link member 414, a second link member 415, and a connection member 416.

The base member 413 is rotatably connected to the support base 411. The base member 413 rotates around the Z axis (first axis). One end of the first link member 414 is rotatably connected to the base member 413.

The first link member 414 rotates around the axis extending in the horizontal direction (second axis). The second link member 415 includes a rotating part 415a and a pivoting part 415b connected to the rotating part 415a. The rotating part 415a is rotatably connected to the other end of the first link member 414. The rotating part 415a rotates around the axis extending in the horizontal direction (third axis). The pivoting part 415b is rotatably connected to the rotating part 415a. The pivoting part 415b rotates around the axis extending in the connection direction with the rotating part 415a (fourth axis).

The connection member 416 includes a rotating part 416a and a pivoting part 416b connected to the rotating part 416a. The rotating part 416a is rotatably connected to the pivoting part 415b of the second link member 415. The rotating part 416a rotates around the axis extending in the horizontal direction (fifth axis). The pivoting part 416b is rotatably connected to the rotating part 416a. The pivoting part 416b rotates around the axis extending in the connection direction with the rotating part 416a (sixth axis).

Figure 5:
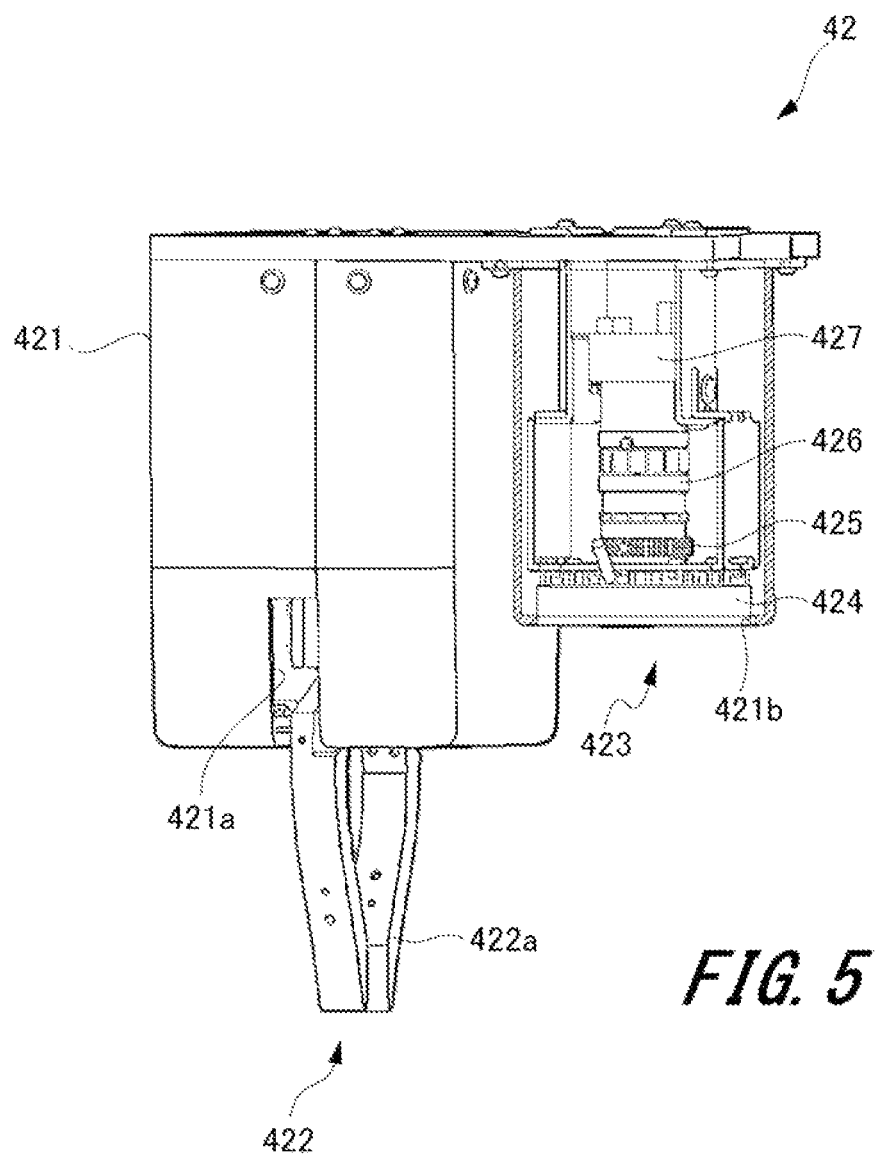
FIG. 5 is a diagram for explaining a configuration of a hand block of the feeder of the component feeding apparatus according to the first embodiment of the present invention.

As illustrated in FIG. 5, the hand block 42 includes a housing 421, and a hand 422 and a camera 423 that are attached to the housing 421.

The housing 421 is connected to the pivoting part 416b (see FIG. 4) of the connection member 416 of the arm 412. The housing 421 is a substantially rectangular parallelepiped housing. The lower surface of the housing 421 is formed with a hand hole 421a and a camera hole 421b. The hand hole 421a allows the hand 422 to pass through. The camera hole 421b exposes a lighting fixture 424, which will be described later, of the camera 423.

The hand 422 includes a plurality of (two in the present embodiment) grasping pieces 422a. Inside the housing 421, an opening/closing mechanism that opens and closes the plurality of grasping pieces 422a and a lifting/lowering mechanism that lifts and lowers the plurality of grasping pieces are provided. The length of the plurality of grasping pieces 422a protruding from the hand hole 421a is changed by being lifted and lowered by the lifting/lowering mechanism. When the length of the plurality of grasping pieces 422a protruding from the hand hole 421a is increased, a space for holding components is widened, and the number of components to be grasped is increased. On the other hand, when the length of the plurality of grasping pieces 422a protruding from the hand hole 421a is shortened, a space for holding components is narrowed, and the number of components to be grasped is reduced.

The plurality of grasping pieces 422a can grasp one component at the tips thereof. The hand 422 grasps one or a plurality of components from a large number of components contained in the container 3A or the container 3B and feeds the one or the plurality of components to the picking table 5A or the picking table 5B. Meanwhile, the hand 422 grasps one component from the one or the plurality of components on the picking table 5A or the picking table 5B and feeds the one component to the placing table 6A or the placing table 6B.

The camera 423 is housed in the housing 421. The camera 423 includes a lighting fixture 424, a polarizing filter 425, a plurality of lenses 426, and a camera body 427. The components constituting the camera 423 are disposed in the order of the lighting fixture 424, the polarizing filter 425, the plurality of lenses 426, and the camera body 427 from the subject side. Subjects are, for example, components on the picking tables 5A and 5B, components contained in the containers 3A and 3B, components grasped by the hand 422, and the like.

The lighting fixture 424 is exposed from the camera hole 421b. The lighting fixture 424 is formed in a ring shape having a photographing hole for allowing light from a subject to pass through. The lighting fixture 424 irradiates the subject with light. In addition, the lighting fixture 424 is configured to be able to adjust the light quantity stepwise. The ON/OFF and light quantity of the lighting fixture 424 are controlled by a recognition controller 714, which will be described later, of the controller 71.

In the photographing hole of the lighting fixture 424, a polarizing film 428 (see FIG. 6) is disposed. The polarizing filter 425 faces the photographing hole of the lighting fixture 424. The polarizing film 428 and the polarizing filter 425 remove regular reflection components of reflected light of the subject. The reflected light of the subject from which regular reflection components have been removed by the polarizing film 428 and the polarizing filter 425 passes through the plurality of lenses 426.

The plurality of lenses 426 forms an image of the subject on the light receiving surface of an image sensor of the camera body 427. The plurality of lenses 426 is supported by a supporter (not illustrated). The supporter (not illustrated) supports each lens of the plurality of lenses 426 in such a manner as to be movable in the optical axis direction. The movement of each lens in the optical axis direction is controlled by the recognition controller 714, which will be described later, of the controller 71.

The camera body 427 includes an image sensor and an image processing circuit. The image sensor includes a plurality of light receiving elements (for example, photodiodes) and a drive circuit for driving each light receiving element. Each light receiving element generates an electric charge corresponding to the quantity of incident light. The drive circuit transmits a pixel signal corresponding to the electric charge generated in each light receiving element to the image processing circuit. The image processing circuit converts the received pixel signal into image data. Then, the camera body 427 outputs the image data to the recognition controller 714, which will be described later, of the controller 71.

[Configuration of Control System]

Next, a configuration of a control system of the component feeding apparatus 1 is described with reference to FIG. 6.

Figure 6:
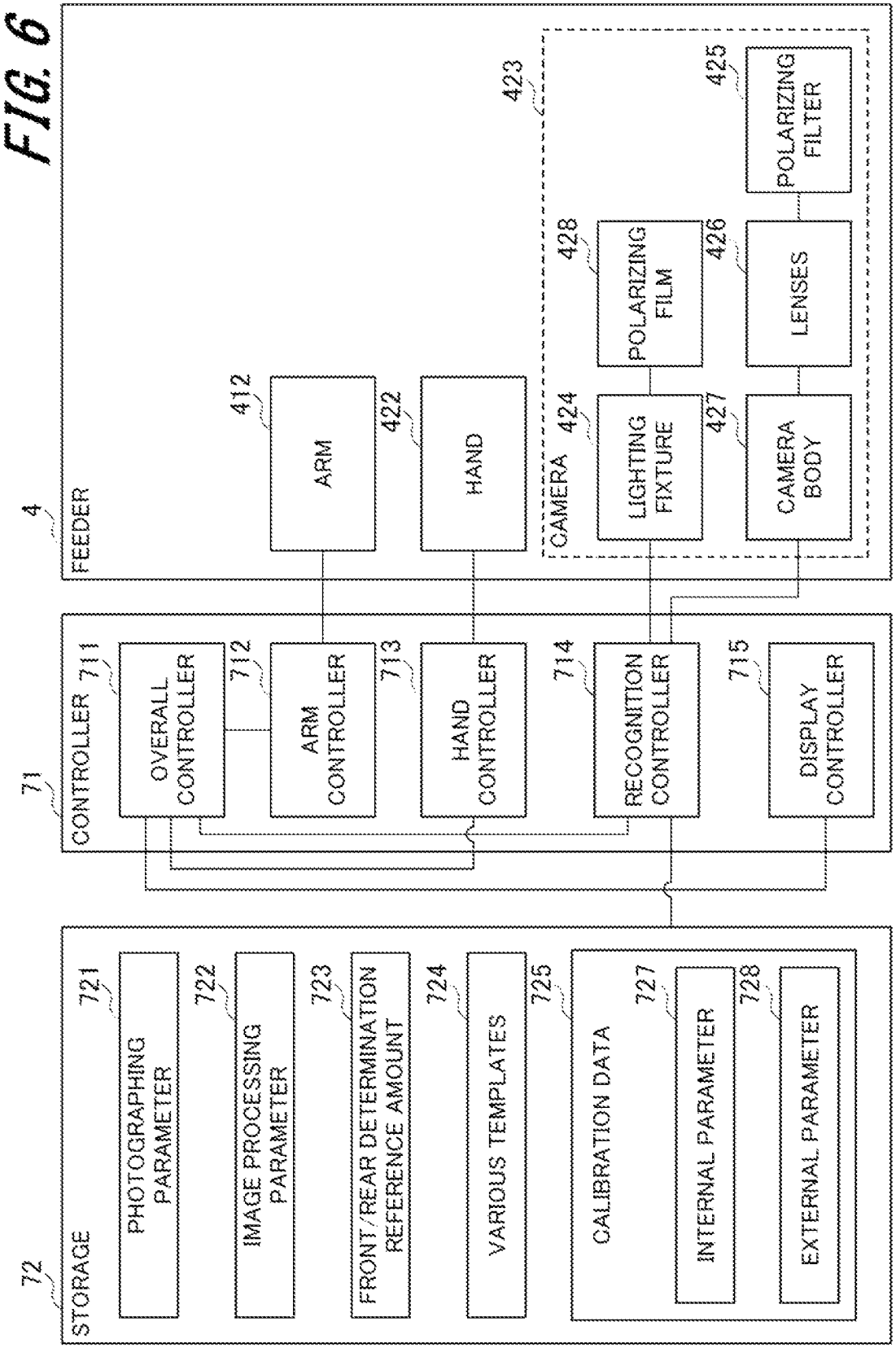
FIG. 6 is a block diagram illustrating a configuration example of a control system of the component feeding apparatus according to the first embodiment of the present invention.

FIG. 6 is a block diagram illustrating a configuration example of the control system of the component feeding apparatus 1.

The control board 7 (see FIG. 1) is provided with the controller 71 and a storage 72. The controller 71 includes a central processing unit (CPU), a read only memory (ROM), and a random access memory (RAM). Various functions of the controller 71 are implemented by the CPU executing predetermined processing programs stored in the ROM. The ROM is used as an example of a computer-readable non-transitory recording medium storing programs to be executed by the CPU. Therefore, these programs are permanently stored in the ROM. The various functions of the controller 71 include, for example, operation control of the arm 412 by an arm controller 712, operation control of the hand 422 by a hand controller 713, component posture determination processing by a recognition controller 714, display control of the displayer 8 by a display controller 715, and the like.

As illustrated in FIG. 6, the controller 71 includes an overall controller 711, the arm controller 712, the hand controller 713, the recognition controller 714, and the display controller 715.

The overall controller 711 is connected to the arm controller 712, the hand controller 713, the recognition controller 714, and the display controller 715. The overall controller 711 receives, from the recognition controller 714, detection results of the positions of the containers 3A and 3B, the hand 422, and the like, the postures of components on the picking tables 5A and 5B, the number of components grasped by the hand 422, and the like. The overall controller 711 performs overall control of the arm controller 712 and the hand controller 713 based on the detection results received from the recognition controller 714, feed parameters stored in the storage 72, and the like. The feed parameters are used to decide the operation of the feeder 4 when components are fed to the picking tables 5A and 5B and the placing tables 6A and 6B. The feed parameters are, for example, a position where the hand 422 starts an operation of grasping components, a conveyance speed of components by the arm 412, and a position where the hand 422 releases the grasping of components.

The arm controller 712 is connected to a driver of the arm 412. The arm controller 712 receives a control command from the overall controller 711. The arm controller 712 generates an arm drive signal for driving the arm 412 based on the control command received from the overall controller 711, and transmits the arm drive signal to the driver of the arm 412. Accordingly, the arm 412 performs the operation according to the control command of the overall controller 711.

The hand controller 713 is connected to a driver of the hand 422. The hand controller 713 receives a control command from the overall controller 711. The hand controller 713 generates a hand drive signal for driving the hand 422 based on the control command received from the overall controller 711, and transmits the hand drive signal to the driver of the hand 422. Accordingly, the hand 422 performs the operation according to the control command of the overall controller 711.

The recognition controller 714 is connected to the camera 423. The recognition controller 714 controls photographing by the camera 423 based on photographing parameters 721 stored in the storage 72. In addition, the recognition controller 714 performs image processing based on image processing parameters (various correction values) stored in the storage 72 on the image data received from the camera 423.

The recognition controller 714 compares the image data subjected to the image processing with various templates 724 stored in the storage 72 to detect the type of components on the picking tables 5A and 5B. In addition, the recognition controller 714 determines the postures (front and rear) of the components based on the image data subjected to the image processing and front/rear determination reference amounts stored in the storage 72. Then, the recognition controller 714 transmits a detection result and a determination result to the overall controller 711.

The display controller 715 is connected to the displayer 8 (see FIG. 3). The display controller 715 receives a control command from the overall controller 711. The display controller 715 generates a display control signal for controlling the displayer 8 based on the control command received from the overall controller 711, and transmits the displayer control signal to the displayer 8. Accordingly, the displayer 8 displays various setting contents according to the control command of the overall controller 711 and error contents.

The storage 72 stores photographing parameters 721, image processing parameters 722, front/rear determination reference amounts 723, various templates 724, and calibration data 725.

The photographing parameters 721 are used when components and the picking tables 5A and 5B are photographed by the camera 423. The photographing parameters 721 are, for example, an exposure time, a light quantity of a lighting fixture, an image size, and the like according to a subject (photographing target). The image processing parameters 722 are various correction values to be used when image processing is performed on image data received from the camera 423.

The front/rear determination reference amounts 723 are reference feature amounts in the surface shape of a component. As the front/rear determination reference amounts 723, at least a first reference amount and a second reference amount are prepared for each type of component. The first reference amount is a feature amount serving as a reference for the surface shape of a first surface (for example, the front surface). The second reference amount is a feature amount serving as a reference for the surface shape of a second surface (for example, the rear surface). The feature amount is, for example, the number of edges (hereinafter, referred to as an "edge number") or the length of the edge (hereinafter, referred to as an "edge length"). The recognition controller 714 determines the posture (front and rear) of a component according to whether the feature amount of the component detected from the image data is close to or matches the first reference amount or the second reference amount.

The various templates 724 are templates for matching two-dimensional shapes (outer shapes) of various components. Of the various templates 724, at least one is prepared for each type of component. The recognition controller 714 compares the two-dimensional shape of the component detected from the image data with the various templates 724 to detect the type of the component in the image data from a matching or approximating template.

The calibration data 725 is used to adjust the photographing position of the camera 423. The calibration data 725 contains internal parameters 727 and external parameters 728. The internal parameters 727 are, for example, a lens distortion correction value, an angle-of-view center position, and the like. In addition, the external parameters 728 are, for example, coordinate correction values for correcting a deviation value of the coordinates of the camera 423 relative to the coordinates of the arm 412.

The recognition controller 714 decides the photographing position of the camera 423 based on the calibration data 725 and the image data transmitted from the camera 423. The overall controller 711 transmits a control command for controlling the operation of the arm 412 to the arm controller 712 according to the photographing position decided by the recognition controller 714. The arm controller 712 controls the driver of the arm 412 according to the control command of the overall controller 711. Accordingly, the camera 423 provided on the hand block 42 is arranged at the photographing position.

[Component Feeding Operation of Component Feeding Apparatus]

Next, a component feeding operation of the component feeding apparatus 1 is described with reference to FIG. 7.

Figure 7:
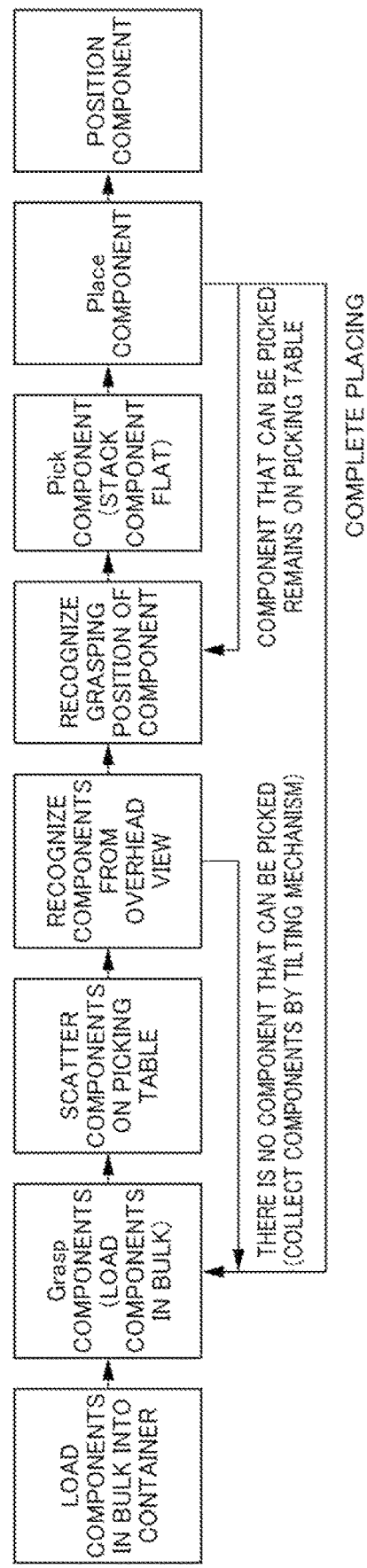
FIG. 7 is a diagram for explaining a component feeding operation of the component feeding apparatus according to the first embodiment of the present invention.

FIG. 7 is a diagram for explaining a component feeding operation of the component feeding apparatus 1. As illustrated in FIG. 7, in order for the component feeding apparatus 1 to feed components to the apparatus in the next process, first, the components are contained in the containers 3A and 3B (hereinafter, referred to as a "container 3"). The components may be contained in the container 3 by an apparatus in the preceding process or by a person.

Next, the feeder 4 grasps one or a plurality of components from a large number of components in the container 3 and feeds the one or the plurality of components to the picking tables 5A or 5B (hereinafter, referred to as a "picking table 5"). At this time, the feeder 4 performs a feeding operation in which the grasped components are scattered on the picking table 5. Hereinafter, the feeding operation in which the components are scattered on the picking table 5 is referred to as a "component scattering operation".

Next, the camera 423 photographs the components on the picking table 5, and the recognition controller 714 of the controller 71 recognizes the components on the picking table 5 from an overhead view. At this time, the recognition controller 714 determines whether there is a component that can be grasped on the picking table 5. When it is determined that there is no component that can be grasped on the picking table 5, the feeder 4 grasps one or a plurality of components from a large number of components in the container 3.

If a component is on the picking table 5 but is at a position where the component cannot be grasped by the feeder 4, it is determined that there is no component that can be grasped on the picking table 5. In this case, a tilting mechanism is driven to tilt the picking table 5. Accordingly, the component on the picking table 5 drops from the picking table 5 and is collected in the container 3.

When it is determined that there is a component that can be grasped on the picking table 5, the recognition controller 714 decides one of the components on the picking table 5 as a component to be grasped, and causes the camera 423 to photograph the component to be grasped. Then, the recognition controller 714 determines, from the image data on the component to be grasped, the posture (front and rear) of the component. Then, the recognition controller 714 recognizes (decides) a position where the hand 422 of the feeder 4 grasps the component.

Next, the feeder 4 grasps one component and feeds the component to the placing table 6A and 6B (hereinafter, referred to as a "placing table 6"). The placing table 6 positions the fed component at a predetermined position. The positioned component is fed to the apparatus in the next step.

When the feeder 4 feeds one component to the placing table 6, the recognition controller 714 decides one of the components on the picking table 5 as a component to be grasped, determines the posture (front and rear) of the component as described above, and recognizes (decides) a position where the hand 422 of the feeder 4 grasps the component. At this time, if there is no component on the picking table 5, the operation of feeding components to the placing table 6 is terminated. Then, the feeder 4 grasps one or a plurality of components from a large number of components in the container 3. Then, the feeder 4 performs the component scattering operation to repeat the feeding of components to the placing table 6.

[Outer Shape, Surface Shape, and Determination Area of Component]

Next, an outer shape, a surface shape, and a determination area of a component are described with reference to FIG. 8.

Figure 8:
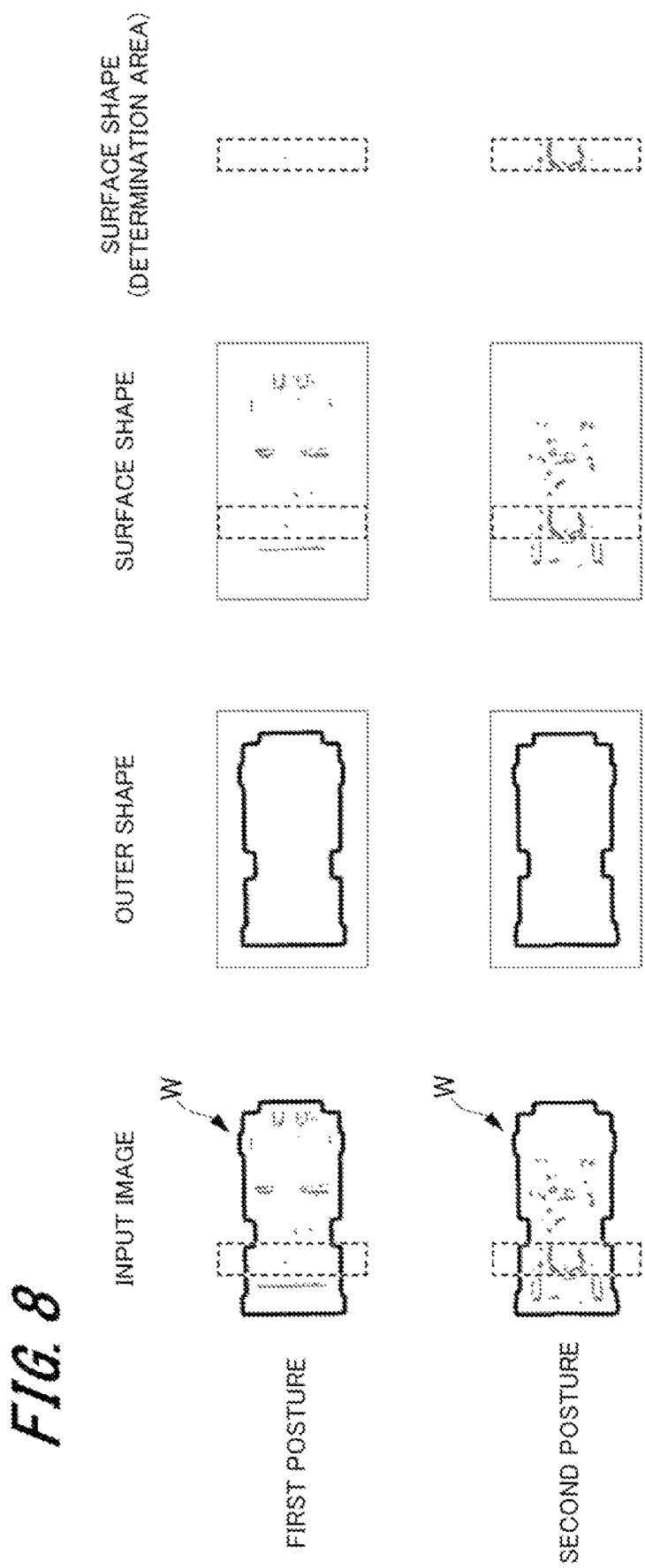
FIG. 8 is a diagram for explaining an outer shape, a surface shape, and a determination area of a component according to the first embodiment of the present invention.

FIG. 8 is a diagram for explaining an outer shape, a surface shape, and a determination area of a component.

First, a posture in which the first surface (front surface) of a component W illustrated in FIG. 8 faces upward is defined as a first posture. In addition, a posture in which the second surface (rear surface) of the component W faces upward is defined as a second posture. In the present embodiment, the surface opposite to the first surface is the second surface, but the second surface may be a surface other than the surface opposite to the first surface.

When the external shape (outer shape) of the first surface is different from the external shape (outer shape) of the second surface, the posture of a component can be determined from the external shape (outer shape) of the component obtained from the image data. However, as illustrated in FIG. 8, when the external shape of the first surface and the external shape of the second surface are the same or substantially the same, it is difficult to determine the posture of a component from the external shape of the component obtained from the image data. Therefore, in the present embodiment, the posture of a component is determined by detecting a feature amount of a surface shape of the component and determining whether the detected feature amount is a feature amount of the first surface or a feature amount of the second surface.

In the present embodiment, the edge number is used as the feature amount. As illustrated in FIG. 8, a plurality of edges are formed on the first surface and the second surface. The component W has variations in texture due to molding (resin molding). In addition, variations in reflected light occur in the image data on the component W. As a result, in the image data on the component W, variations in the surface edge shape the occur. Accordingly, even if the component W is of the same type (the same shape), there is no reproducibility in the detection of the edges on the entire first surface and the entire second surface.

Therefore, the inventor has focused on an area where the difference in the edge numbers between the first surface and the second surface is large. If an area has a large difference between the edge number of the first surface and the edge number of the second surface, it is possible to reduce erroneous determination as to whether the surface is the first surface or the second surface even if some error occurs in edge detection. In the present embodiment, the area having a large difference between the edge number of the first surface and the edge number of the second surface is set as a determination area. Then, the posture of the component W is determined by comparing the edge number in the determination area in the image obtained by photographing the component W with reference edge numbers in the determination areas of the first surface and the second surface.

As illustrated in FIG. 8, in the present embodiment, an area in which edges do not stably appear on the first surface and a relatively large number of edges appear on the second surface is set as the determination area. However, the determination area may be an area in which a relatively large number of edges appear on the first surface and edges do not stably appear on the second surface. Alternatively, a point where variations in texture due to molding (resin molding) hardly occur and a difference in the edge numbers between the first surface and the second surface occurs may be set as the determination area.

A point where edges appear varies depending on the type of component, the mold for molding a component, the posture of a component, and the like. Therefore, the determination area is set at least for each type of component. In addition, when different molds are used according to production lots of components, the determination area may be set for each production lot of components or each mold.

The number of determination areas is not limited to one, and may be two or more. When the number of determination areas is two or more, the posture of a component is determined by comparing the total number of detected edges with a reference edge number. Alternatively, when the number of determination areas is two or more, the posture of a component may be determined by comparing the ratio of the edge number detected in each determination area with the ratio of the reference edge number in each determination area.

The edges detected from the image are affected by shadows. Therefore, edges can be detected or cannot be detected depending on a position and a rotation posture (a rotation direction along the surface of the picking table 5 on which components are placed) of the components existing within the angle of view. For this reason, in the present embodiment, the position and the rotational posture of a component in an image to be captured for detecting the edges are unified.

The position and the rotational posture of a component are identified from the external shape of the component. Then, the photographing position of the camera 423 is adjusted to photograph the component with the same angle of view and the same rotational posture. Accordingly, the edge number in the determination area can be detected from the image of the component in the unified position and rotational posture. As a result, the accuracy of the posture determination of the component can be enhanced.

The reference edge numbers in the determination areas of the first surface and the second surface may be decided based on, for example, a maximum value or a minimum value of the edge numbers detected in the determination areas from a large number of samples. The reference edge number in the determination area of the first surface is stored in the storage 72 as the first reference amount. In addition, the reference edge number in the determination area of the second surface is stored in the storage 72 as the second reference amount. The first reference amount and the second reference amount are included in the above front/rear determination reference amounts 723.

[Comparison of First Reference Amount and Second Reference Amount with Detected Feature Amounts]

Next, comparison of the first reference amount and the second reference amount with feature amounts detected from an image is described with reference to FIG. 9.

Figure 9:
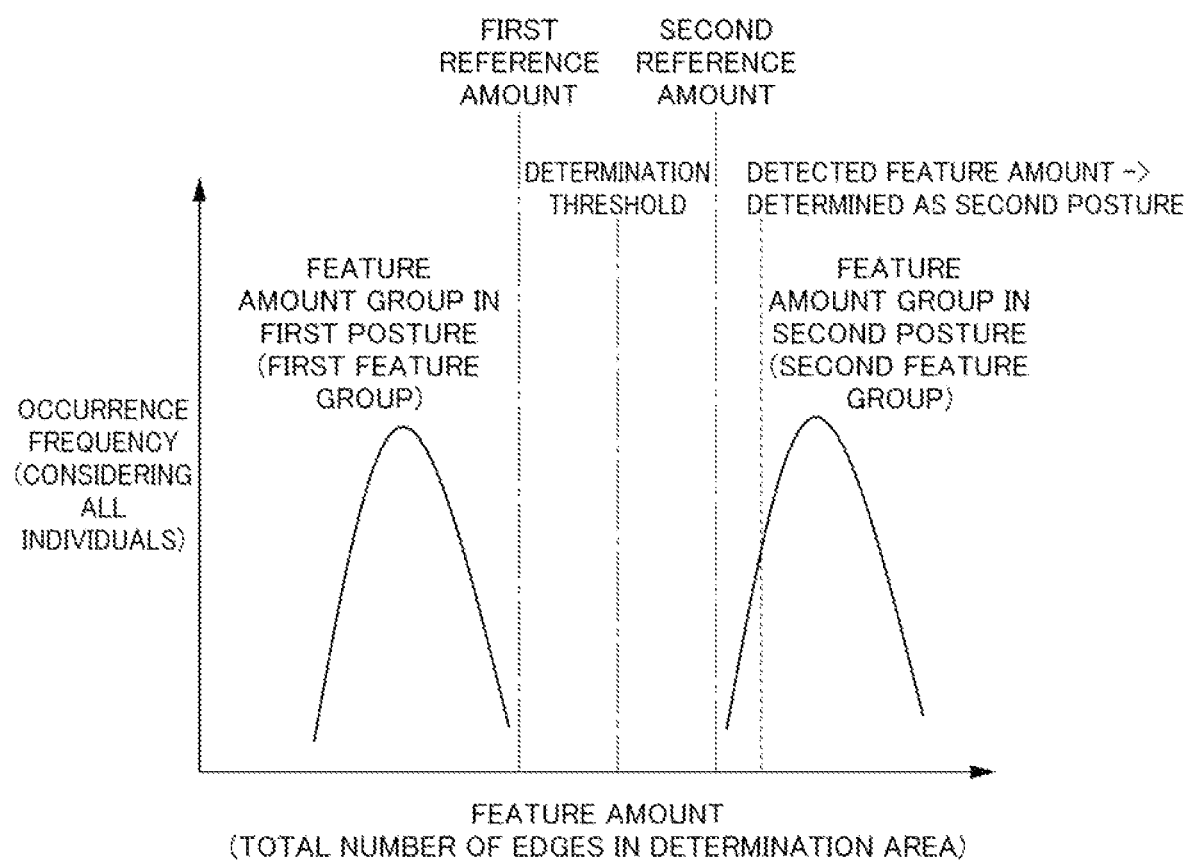
FIG. 9 is a graph for explaining comparison of a first reference amount and a second reference amount with a detected feature amount according to the first embodiment of the present invention.

FIG. 9 is a graph for explaining comparison of the first reference amount and the second reference amount with detected feature amounts.

The horizontal axis of the graph illustrated in FIG. 9 indicates feature amounts (edge numbers) detected in the determination area, and the vertical axis indicates the occurrence frequency of the detected feature amounts. As described above, in the determination area, there is a difference in the feature amounts between the first surface and the second surface. In the present embodiment, an area in which edges do not stably appear on the first surface and a relatively large number of edges appear on the second surface is set as the determination area. Therefore, the feature amounts in a first feature amount group are smaller the feature amounts in a second feature amount group.

A collection of feature amounts detected in the determination area of the first posture (first surface) is set as the first feature amount group. In addition, a collection of feature amounts detected in the determination area of the second posture (second surface) is set as the second feature amount group. The range of the feature amounts in the first feature amount group and the range of the feature amounts in the second feature amount group do not overlap. That is, an area in which the range of the feature amounts in the first feature amount group and the range of the feature amounts in the second feature amount group do not overlap is set as the determination area.

The first reference amount is set to the maximum value of the feature amounts in the first feature amount group acquired as samples. In addition, the second reference amount is set to the minimum value of the feature amounts in the second feature amount group acquired as samples. Note that the first reference amount may be set to a feature amounts of $+3\sigma$ in the first feature amount group acquired as samples, and the second reference amount may be set to feature amounts of $-3\sigma$ in the second feature amount group acquired as samples.

For example, when the feature amount detected from the image obtained by photographing a component on the picking table 5 is greater than the second reference amount, it can be determined that the component is in the second posture (the posture in which the second surface faces upward). However, it is also possible that the feature amount detected from the image obtained by photographing a component on the picking table 5 is a value greater than the first reference amount and less than the second reference amount.

For this reason, in the present embodiment, an intermediate value between the first reference amount and the second reference amount is set as a determination threshold. Then, when the detected feature amount is equal to or less than (is less than) the determination threshold, it is determined that the component is in the first posture, and when the detected feature amount is greater than (is equal to or greater than) the determination threshold, it is determined that the component is in the second posture. Note that the determination threshold according to the present invention may be, for example, an intermediate value between the $\pm 3\sigma$ interval of the first feature amount group and the $\pm 3\sigma$ interval of the second feature amount group.

In addition, the feature amount detected from the image obtained by photographing the component on the picking table 5 varies depending on the distance (photographing distance) between the camera 423 and the component. Therefore, the first reference amount, the second reference amount, and the determination threshold may be changed according to the photographing distance. Accordingly, if the photographing distances are different, the posture determination of the component can be accurately performed.

When the first reference amount, the second reference amount, and the determination threshold are changed, those corresponding to the photographing distance may be extracted with reference to table data stored in advance in the storage 72. Alternatively, the first reference amount, the second reference amount, and the determination threshold may be calculated by substituting the photographing distance into a calculation formula stored in advance in the storage 72.

[Posture Determination Processing]

Next, the posture determination processing to be performed by the recognition controller 714 is described with reference to FIG. 10.

Figure 10:
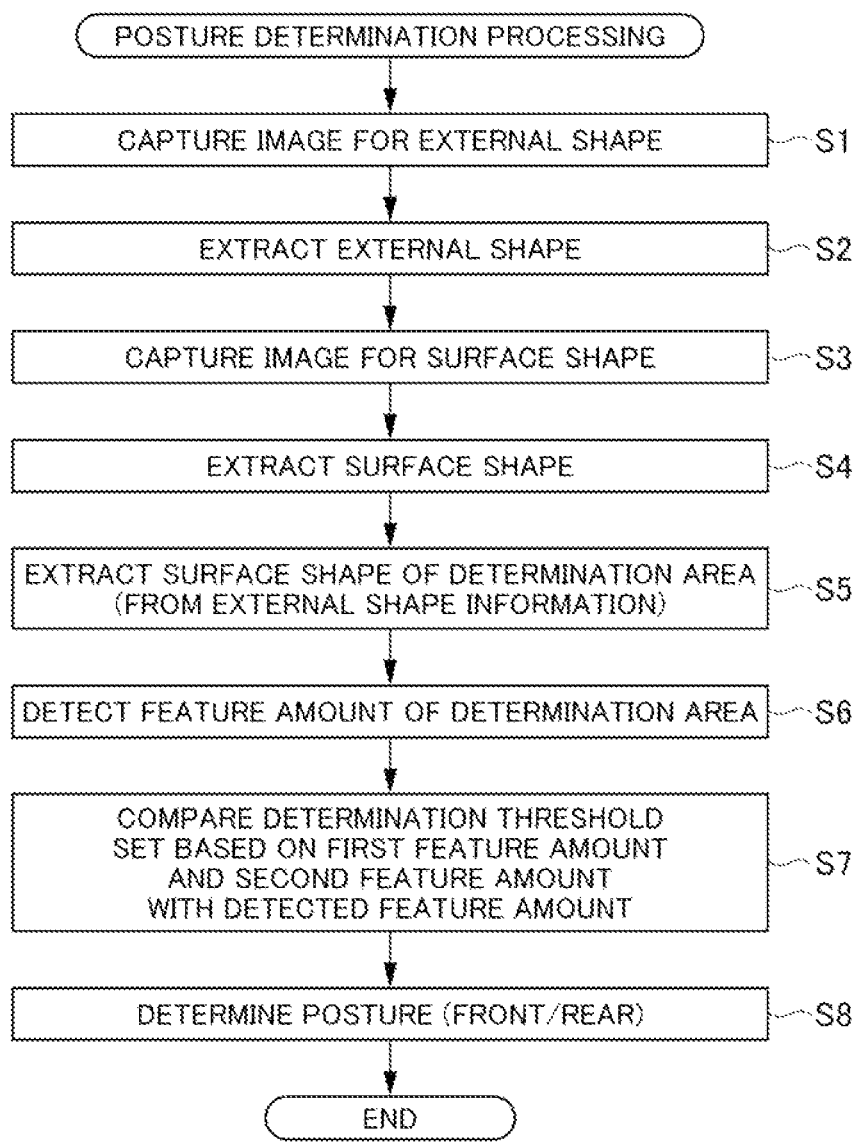
FIG. 10 is a flowchart illustrating an example of posture determination processing of the component feeding apparatus according to the first embodiment of the present invention.

FIG. 10 is a flowchart illustrating an example of posture determination processing according to the first embodiment.

First, the recognition controller 714 causes the camera 423 to capture an image for extracting the external shape of a component (S1).

Next, the recognition controller 714 extracts the external shape of the component from the image data captured in step S1 (S2). In this processing, the recognition controller 714 performs image processing for widening the luminance difference of the image data using a gamma correction value, and then binarizes the image data to extract the external shape of the component. In addition, the recognition controller 714 detects the type of component from the extracted external shape and the various templates 724. The recognition controller 714 further detects the position and the rotation posture of the component.

Next, the recognition controller 714 decides the photographing position of the camera 423 based on the position and the rotation posture of the component, and transmits a decision result to the overall controller 711. Accordingly, the overall controller 711 transmits a control command to the arm controller 712 to arrange the camera 423 at the photographing position. Then, the recognition controller 714 causes the camera 423 to capture an image for extracting the surface shape of the component (S3).

Next, the recognition controller 714 extracts the surface shape of the component from the image data captured in step S3 (S4). In this processing, the recognition controller 714 performs image processing for emphasizing the luminance gradient of the image data using a gamma correction value, and then detects edges by, for example, a canny method.

Next, the recognition controller 714 decides the determination area from the type and the external shape of the component, and extracts the surface shape of the determination area (S5). Then, the recognition controller 714 detects the feature amount (the edge number) in the determination area (S6).

Next, the recognition controller 714 compares the determination threshold set based on the first reference amount and the second reference amount with the feature amount detected in step S6 (S7). Then, the recognition controller 714 determines the posture of the component on the picking table 5 from the comparison result in step S7 (S8). After the processing in step S8, the recognition controller 714 terminates the posture determination processing.

As described above, in the posture determination processing according to the present embodiment, even if variations in the edge shape occur for each component, the detected feature amount can be compared with a predetermined reference amount (determination threshold) in the determination area where the influence of the variations is small. As a result, the posture (front and rear) of the component can be accurately determined.

2. Second Embodiment

Next, a component feeding apparatus according to a second embodiment will be described. The component feeding apparatus according to the second embodiment has the same configuration as the component feeding apparatus 1 (see FIG. 1) according to the first embodiment. The difference between the component feeding apparatus according to the second embodiment and the component feeding apparatus 1 according to the first embodiment is posture determination processing. Therefore, the posture determination processing according to the second embodiment is described here, and the description overlapping with the first embodiment is omitted.

[Comparison of First Reference Amount and Second Reference Amount with Detected Feature Amounts]

Figure 11:
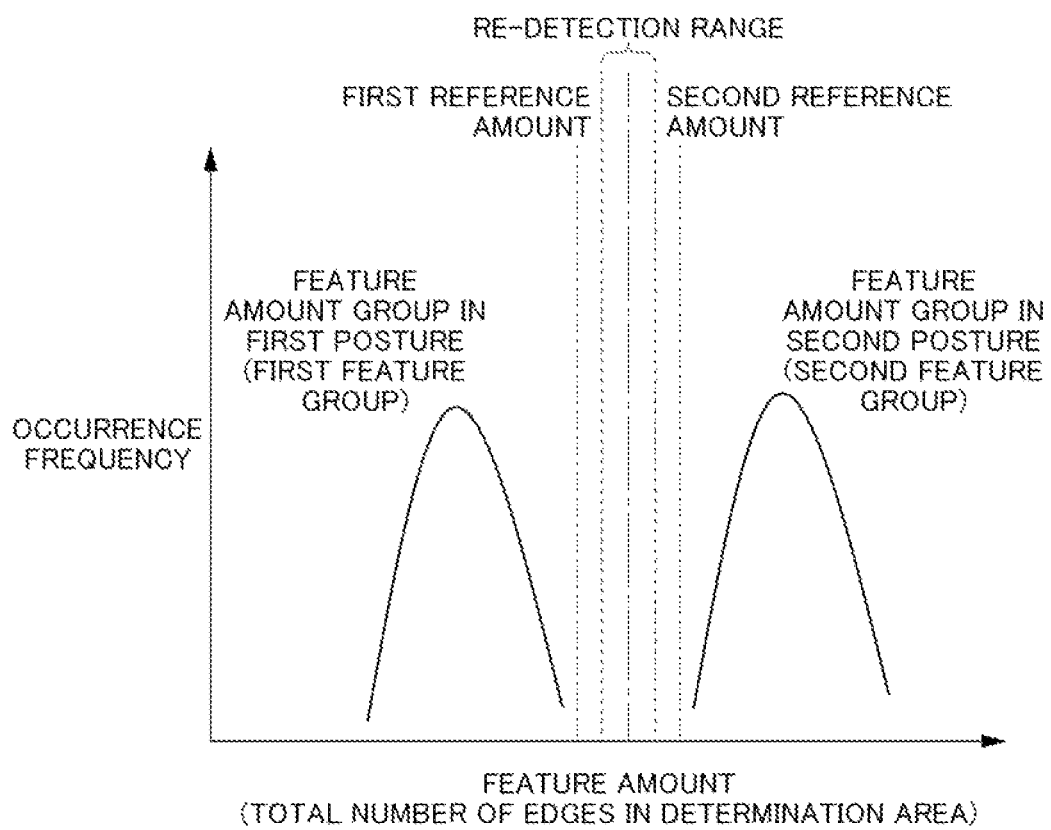
FIG. 11 is a graph for explaining comparison of a first reference amount and a second reference amount with a detected feature amount according to a second embodiment of the present invention.

Next, comparison of a first reference amount and a second reference amount with a feature amount detected from an image according to the second embodiment is described with reference to FIG. 11. FIG. 11 is a graph for explaining comparison of a first reference amount, a second reference amount with a detected feature amount according to the second embodiment.

The horizontal axis of the graph illustrated in FIG. 11 indicates feature amounts (edge numbers) detected in a determination area, and the vertical axis indicates the occurrence frequency of the detected feature amounts. As described above, there is no overlapping range between a first feature amount group that is a collection of feature amounts detected in the determination area in the first posture (first surface) and a second feature amount group that is a collection of feature amounts detected in the determination area in the second posture (second surface).

The first reference amount is set to the maximum value of the feature amounts in the first feature amount group acquired as samples. In addition, the second reference amount is set to the minimum value of the feature amounts in the second feature amount group acquired as samples. Note that the first reference amount may be set to a feature amounts of +3σ in the first feature amount group acquired as samples, and the second reference amount may be set to feature amounts of −3σ in the second feature amount group acquired as samples.

Incidentally, when the detected feature amount is greater than the first reference amount or smaller than the second reference amount, there is a possibility that a malfunction that extraction of the surface shape or detection of the feature amount has not been normally performed has occurred. Therefore, in the present embodiment, a predetermined range greater than the first reference amount and less than the second reference amount is set as a re-detection range. Then, when the detected feature amount is included in the re-detection range, the component whose posture is to be determined is newly photographed to detect the feature amount again.

The re-detection range can be appropriately set within a range greater than the first reference amount and less than the second reference amount. For example, the re-detection range may be greater than the first reference amount and less than the second reference amount.

[Posture Determination Processing]

Next, posture determination processing according to the second embodiment is described with reference to FIG. 12.

Figure 12:
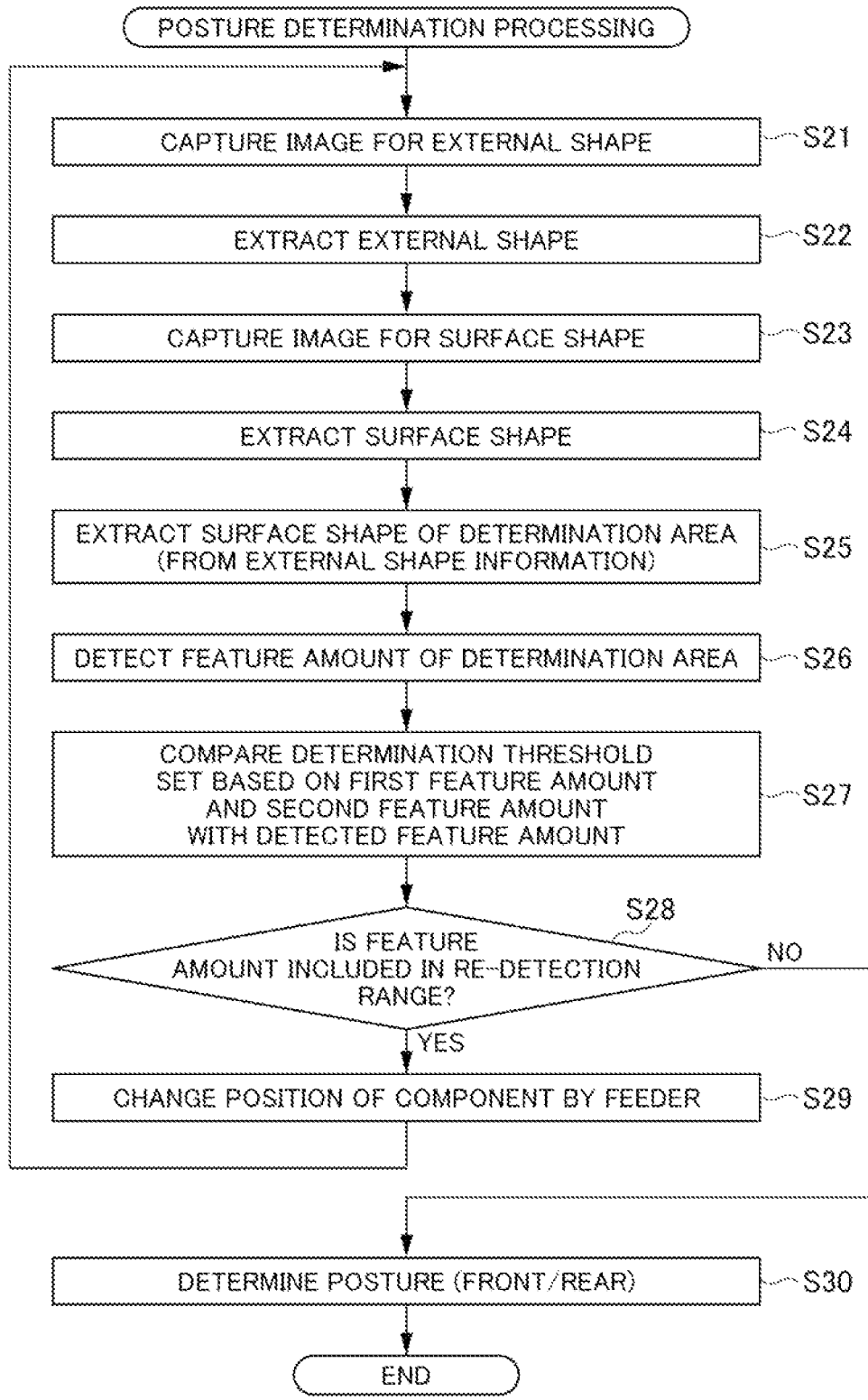
FIG. 12 is a flowchart illustrating an example of posture determination processing of a component feeding apparatus according to the second embodiment of the present invention.

FIG. 12 is a flowchart illustrating an example of posture determination processing according to the second embodiment.

Steps S21 to S26 of the posture determination processing according to the second embodiment are the same as steps S1 to S6 of the posture determination processing according to the first embodiment. Therefore, the description for steps S21 to S26 is omitted.

After the processing in step S26, the recognition controller 714 compares the re-detection range set based on the first reference amount and the second reference amount with the feature amount detected in step S26 (S27). Then, the recognition controller 714 determines whether the feature amount detected in step S26 is included in the re-detection range (S28).

When it is determined in step S28 that the feature amount detected in step S26 is included in the re-detection range (YES in S28), the overall controller 711 transmits a control command to the arm controller 712 and the hand controller 713 to cause the feeder 4 to change the position of the component (S29).

In the processing in step S29, the hand 422 may grasp the component to change the position of the component, or the hand 422 may push the component to change the position of the component. This can possibly eliminate a malfunction that extraction of the surface shape or detection of the feature amount is not normally performed due to the influence of the reflected light of the component.

After the processing in step S29, the recognition controller 714 returns to the processing in step S21. Note that, when the detected feature amount is included in the re-detection range although the detection of the feature amount is repeated a plurality of times, the posture determination processing may be suspended, and a determination error may be output to a displayer (not illustrated).

When it is determined in step S28 that the feature amount detected in step S26 is not included in the re-detection range (NO in step S28), the recognition controller 714 determines the posture of the component on the picking table 5 from the comparison result in step S27 (S30). After the processing in step S30, the recognition controller 714 terminates the posture determination processing.

As described above, in the posture determination processing according to the present embodiment, even if variations in the edge shape occur for each component, the detected feature amount can be compared with a predetermined reference amount (determination threshold) in the determination area where the influence of the variations is small. As a result, the posture (front and rear) of the component can be accurately determined. In addition, if there is a possibility that a malfunction that extraction of the surface shape or detection of the feature amount has not been normally performed has occurred, the detection of the feature amount is performed again. As a result, the accuracy of the posture (front/rear) determination of the component can be enhanced.

The embodiments of the posture determination method, the computer-readable recording medium storing the program, and the component feeding apparatus of the present invention have been described above including the effects thereof. However, the posture determination method, the computer-readable recording medium storing the program, and the component feeding apparatus of the present invention are not limited to the above embodiments, and various modifications can be made without departing from the gist of the invention described in the claims.

For example, in the above first and second embodiments, the edge number is adopted as the feature amount in the surface shape of a component. However, as the feature amount according to the present invention, the length of the edge or the area of the edge described above may be adopted.

In the above second embodiment, when the detected feature amount is included in the re-detection range, the position of a component is changed (see S29 in FIG. 12), and then the image of the component is newly captured. However, if the detected feature amount is included in the re-detection range, the image of the component may be captured by changing the photographing position or the photographing posture of the camera without changing the position of the component. In addition, both the position of the component and the photographing position or the photographing posture of the camera may be changed.

In the first and second embodiments described above, the hand 422 of the feeder 4 is configured to grasp a component and feed the component to the picking table 5. However, the feeder according to the present invention is not limited to the grasping configuration. For example, the feeder may hold a component by another method such as a belt mechanism, suction, air suction, magnetic suction, or holding with a container-shaped member, and release the held component.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS 1, 100 . . . component feeding apparatus
2 . . . frame
3, 3A, 3B . . . container
4 . . . feeder
5, 5A, 5B, 105 . . . picking table
6, 6A, 6B . . . placing table
7 . . . control board
8 . . . displayer
31 . . . slit
32 . . . shutter
32a . . . flange
41 . . . arm block
42 . . . hand block
51 . . . stacking plate
52, 53, 54 . . . wall plate
71 . . . controller
72 . . . storage
104 . . . conveyer (container and feeder)
108 . . . guide plate
123, 423 . . . camera
411 . . . support base
412 . . . am
413 . . . base member
414 . . . first link member
415 . . . second link member
416 . . . connection member
421 . . . hosing
422 . . . hand
422a . . . grasping piece
423 . . . camera
424 . . . lighting fixture
425 . . . polarizing filter
426 . . . a plurality of lenses 427 . . . camera body
428 . . . polarizing film
711 . . . overall controller
712 . . . arm controller
713 . . . hand controller
714 . . . recognition controller
715 . . . display controller
721 . . . photographing parameter
722 . . . image processing parameter
723 . . . front/rear determination reference amount
724 . . . various templates
725 . . . calibration data

The invention claimed is:

1. A posture determination method of determining, based on an image acquired for a component having a plurality of surfaces, a posture of the component, the posture determination method comprising:
   recognizing an outer shape of the component from the image;
   detecting a feature amount of a surface shape in a determination area being a part of the component based on the outer shape of the component recognized in the recognizing, the feature amount including number of edges on a surface of the component;
   determining the posture of the component by comparing a first reference amount indicating a reference feature amount in the determination area of a first surface of the component and a second reference amount indicating a reference feature amount in the determination area of a second surface of the component with the feature amount detected in the detecting; and
   acquiring a new image of the component to determine the posture when the feature amount detected in the detecting is included in a predetermined range between the first reference amount and the second reference amount, and wherein the predetermined range is based on an occurrence frequency of the number of edges on the surface of the component.

2. The posture determination method according to claim 1, wherein
   the first reference amount and the second reference amount are ratios of feature amounts in two or more of the determination areas.

3. The posture determination method according to claim 1, wherein
   the first reference amount and the second reference amount are changed according to a photographing distance of the acquired image.

4. The posture determination method according to claim 1, wherein,
   when an image of the component is newly acquired, a photographing position or a photographing posture is changed.

5. A non-transitory recording medium storing a computer readable program causing a computer of a component feeding apparatus including a feeder that holds and feeds a component on a picking table to perform:
   recognizing an outer shape of the component from an image acquired for the component on the picking table;
   detecting a feature amount of a surface shape in a determination area being a part of the component based on the recognized outer shape of the component, the feature amount including number of edges on a surface of the component;
   determining a posture of the component by comparing a first reference amount indicating a reference feature amount in the determination area of a first surface of the component and a second reference amount indicating a reference feature amount in the determination area of a second surface of the component with the feature amount detected from the image; and
   acquiring a new image of the component to determine the posture when the feature amount detected in the detecting is included in a predetermined range between the first reference amount and the second reference amount, and wherein the predetermined range is based on an occurrence frequency of the number of edges on the surface of the component.

6. A component feeding apparatus comprising:
   a picking table;
   a camera capable of photographing a component on the picking table;
   a feeder that holds the component on the picking table and places the component at a feeding position; and
   a hardware processor that controls an operation of the feeder according to a posture of the component on the picking table, wherein
   the hardware processor:
      recognizes an outer shape of the component from an image captured by the camera, detects a feature amount of a surface shape in a determination area being a part of the component based on the recognized outer shape of the component, the feature amount including number of edges on a surface of the component,
      determines the posture of the component by comparing a first reference amount indicating a reference feature amount in the determination area of a first surface of the component and a second reference amount indicating a reference feature amount in the determination area of a second surface of the component with the feature amount detected from the image, and
      acquires a new image of the component to determine the posture when the feature amount detected in the detecting is included in a predetermined range between the first reference amount and the second reference amount, and wherein the predetermined range is based on an occurrence frequency of the number of edges on the surface of the component.

7. The component feeding apparatus according to claim 6, comprising
   a storage that stores the first reference amount and the second reference amount.

8. The component feeding apparatus according to claim 6, wherein
   before the camera newly photographs the component on the picking table, the feeder grasps the component to change a position of the component.

* * * * *